(12) United States Patent
Tseng

(10) Patent No.: US 7,275,866 B2
(45) Date of Patent: Oct. 2, 2007

(54) DIGITAL THERMOMETER

(76) Inventor: Chao-Man Tseng, No. 56, Wu Kung 5th Rd., Wuku Hsiang, Taipei County (TW)

( * ) Notice: Subject to any disclaimer, the term of this patent is extended or adjusted under 35 U.S.C. 154(b) by 7 days.

(21) Appl. No.: 11/269,684

(22) Filed: Nov. 9, 2005

(65) Prior Publication Data

US 2007/0104246 A1    May 10, 2007

(51) Int. Cl.
*G01K 3/00* (2006.01)
*A61B 5/01* (2006.01)

(52) U.S. Cl. ............... 374/163; 374/102; 374/107; 702/139; 600/549

(58) Field of Classification Search ............... 374/163, 374/164, 183, 100, 102, 107; 702/139; 600/474, 600/549
See application file for complete search history.

(56) References Cited

U.S. PATENT DOCUMENTS

| 3,603,150 | A | * | 9/1971 | Kurtin et al. ............... 374/185 |
| 3,791,214 | A | * | 2/1974 | Keith ........................ 374/164 |
| 4,475,158 | A | * | 10/1984 | Elias ........................ 600/549 |
| 4,843,577 | A | * | 6/1989 | Muramoto ................. 702/131 |
| 5,015,102 | A | * | 5/1991 | Yamaguchi ................ 374/107 |
| 5,181,008 | A | * | 1/1993 | Martin et al. ............... 338/28 |
| 5,392,031 | A | * | 2/1995 | Toriumi et al. ............ 340/588 |
| 5,473,629 | A | * | 12/1995 | Muramoto ................. 374/102 |
| 5,829,878 | A |   | 11/1998 | Weiss et al. |
| 6,059,452 | A | * | 5/2000 | Smith et al. ................ 374/169 |
| 6,827,487 | B2 | * | 12/2004 | Baumbach ................. 374/164 |
| 6,839,651 | B2 | * | 1/2005 | Lantz et al. ................ 702/130 |
| 6,854,882 | B2 | * | 2/2005 | Chen ......................... 374/208 |
| 7,059,767 | B2 | * | 6/2006 | Tokita et al. ............... 374/163 |
| 2001/0002918 | A1 | * | 6/2001 | Tatoh ........................ 374/179 |
| 2006/0072645 | A1 | * | 4/2006 | Quinn et al. ............... 374/163 |
| 2007/0055171 | A1 | * | 3/2007 | Fraden ....................... 600/549 |
| 2007/0100253 | A1 | * | 5/2007 | Sisk et al. .................. 600/549 |

FOREIGN PATENT DOCUMENTS

JP          58167932 A    * 10/1983

* cited by examiner

*Primary Examiner*—Gail Verbitsky

(57) ABSTRACT

A digital thermometer; having an thermometer body comprises a processing unit serves to integrate the signals of the digital thermometer and sets some operations; the processing unit calculating temperature from the heating sensing unit and then transfers temperature signals; before a predetermined measured time, if a thermal balance has been achieved, the processing unit will conduct the backlight plate to emit light so as to alert the user that the measurement will complete; a heating sensing unit for sensing temperatures of an object to be measured; a display unit for receiving electronic signals from the heating sensing unit so as to display the measured temperature; and a backlight plate for receiving signals from the processing unit and emitting light to illuminate the display unit.

10 Claims, 4 Drawing Sheets

DIGITAL THERMOMETER

FIELD OF THE INVENTION

The present invention relates to a digital thermometer which can improve the alert method of the prior art and is a personalized design.

BACKGROUND OF THE INVENTION

Measurement of temperature of the human body is necessary for the health protection of the human body because the enzyme actions of human body must be performed at a desired temperature level so as to have a high efficiency and to retain the health of human body. If the temperature of the human body is out of control, then the health of the body will easy get disease. Thereby it is important to have the information of the body temperature by using a thermometer.

In one prior art, U. S. Pat. No. 5,829,878, a processing unit is used to actuate a backlight plate to illuminate a display unit of a thermometer so that the use can easily views the measured temperature value. When the measured temperature is over a normal value, a colored light is displayed. However in this prior art, the backlight is emitted after the measurement is complete. Thereby in measurement, the thermometer is placed below the ear or axilla so that the user cannot see the temperature value directly. Thus, in the measuring process, the user cannot adjust whether the temperature value is within a normal value. It is not a personalized design. Thereby a novel design is necessary.

SUMMARY OF THE INVENTION

Accordingly, the primary object of the present invention is to provide a digital thermometer which can improve the alert method of the prior art and is a personalized design.

To achieve above objects, the present invention provides a digital thermometer. The digital thermometer has an thermometer body comprises a processing unit serves to integrate the signals of the digital thermometer and sets some operations; the processing unit calculating temperature from the heating sensing unit and then transfers temperature signals; before a predetermined measured time, if a thermal balance has been achieved, the processing unit will conduct the backlight plate to emit light so as to alert the user that the measurement will complete; a heating sensing unit for sensing temperatures of an object to be measured; a display unit for receiving electronic signals from the heating sensing unit so as to display the measured temperature; and a backlight plate for receiving signals from the processing unit and emitting light to illuminate the display unit.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
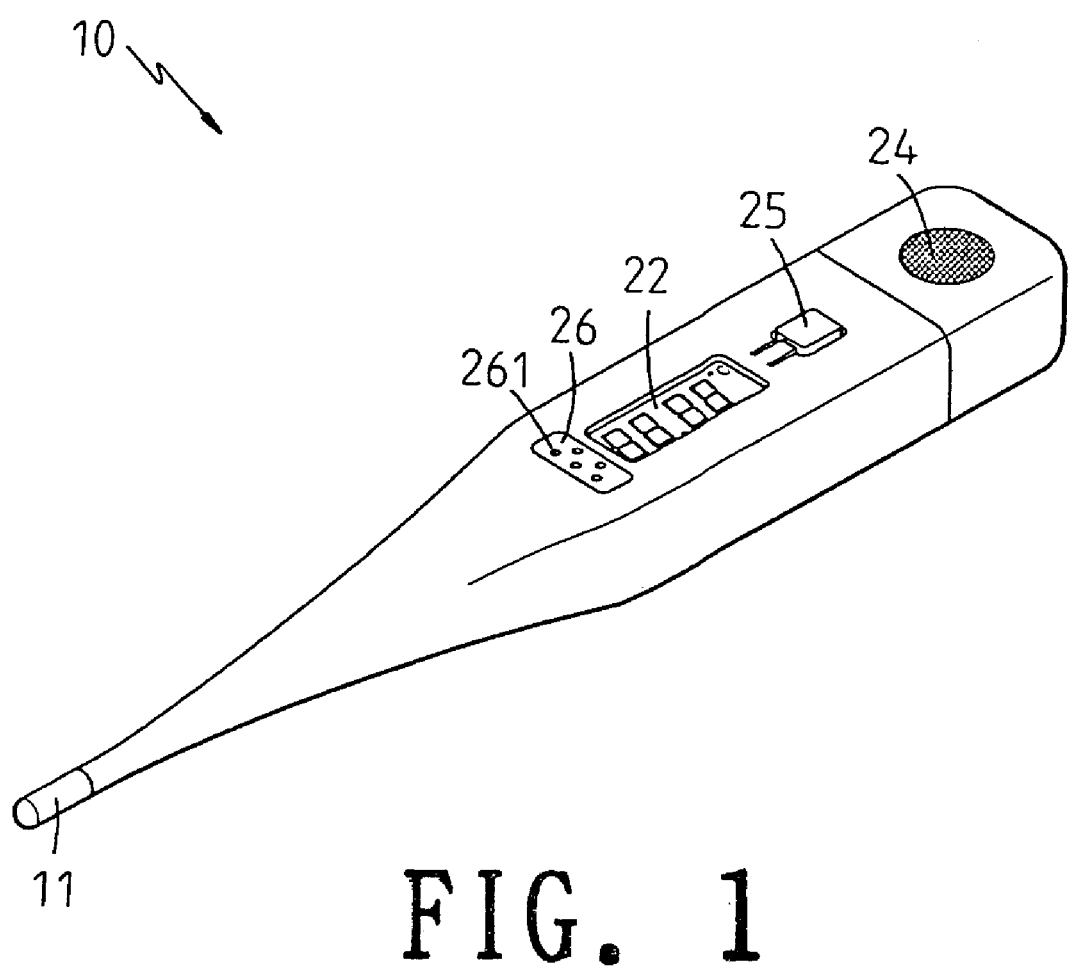
FIG. 1 is a schematic view about the digital thermometer of the present invention.
Figure 2:
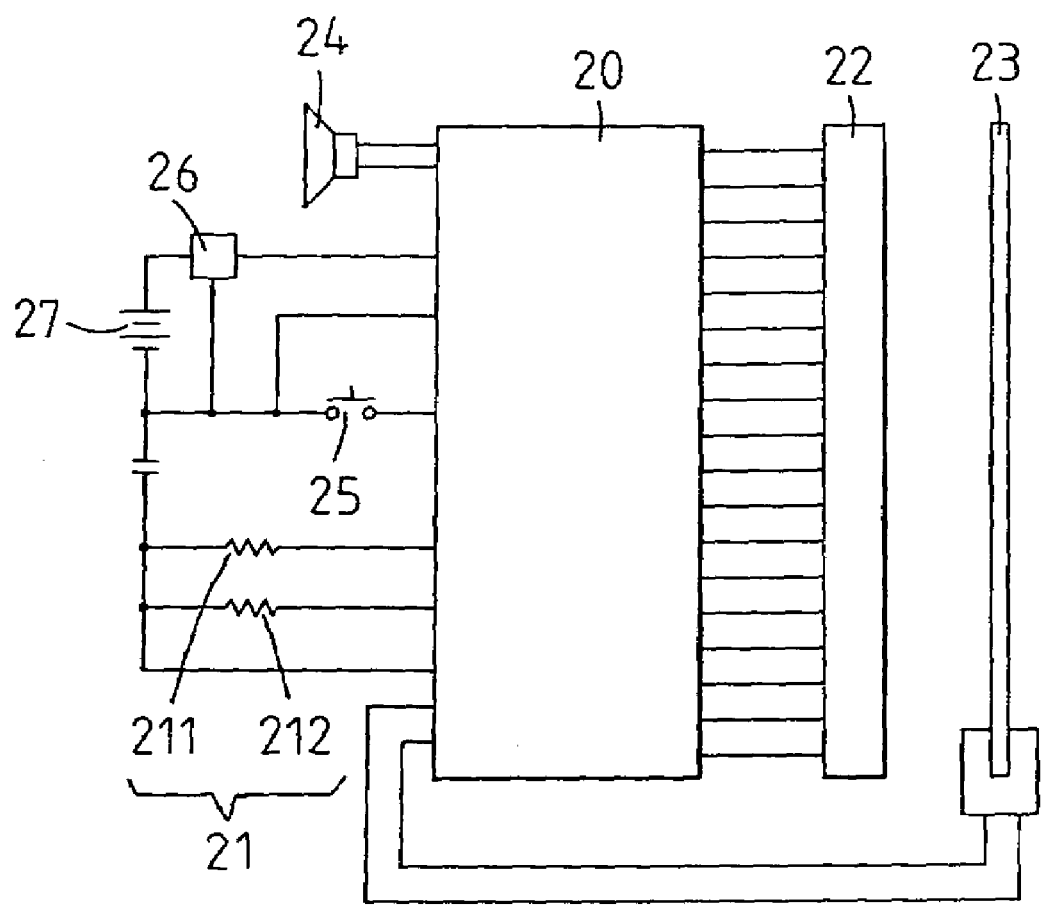
FIG. 2 shows the circuit arrangement of the digital thermometer of the present invention.
Figure 3:
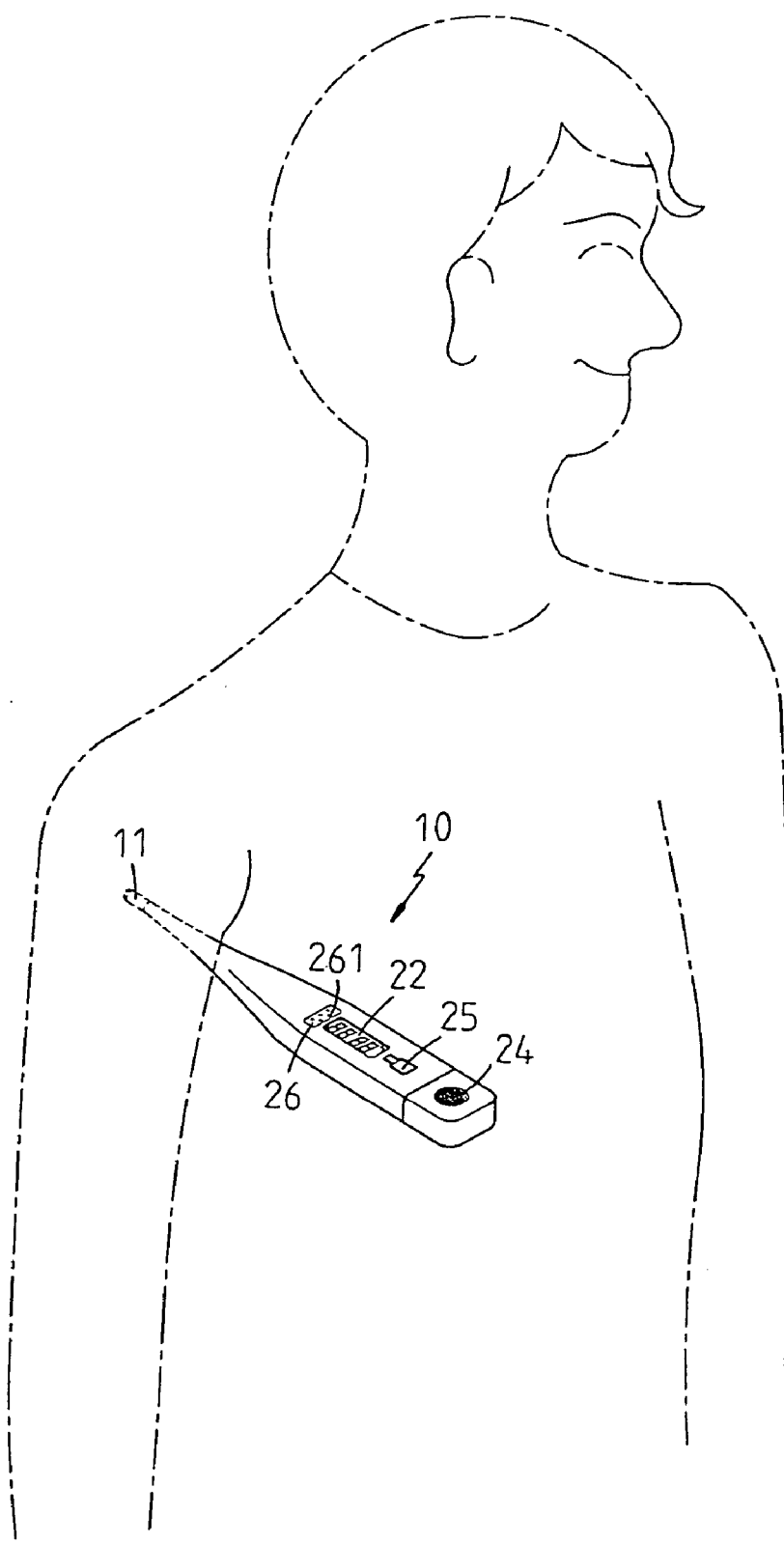
FIG. 3 is a structural schematic view of the digital thermometer of the present invention.
Figure 4:
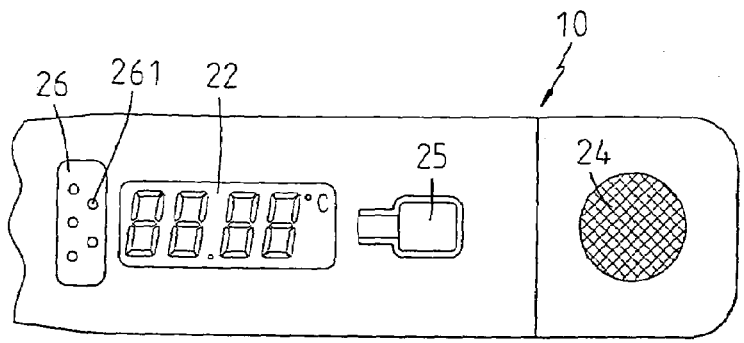
FIG. 4 shows the states of the display unit of the present invention, where the backlight plate does not emit light.

Referring to FIGS. 1 and 2, the digital thermometer of the present invention is illustrated. The present invention includes a thermometer body 10, a heating sensing unit 21, a display unit 22, a backlight plate 23, a buzzer 24, a power switch 25, an adjusting unit 26, and a battery set 27.

The processing unit 20 serves to integrate the signals of the system and sets some operations. The processing unit 20 calculates temperature from the heating sensing unit 21 and then transfers temperature signals to he display unit 22. The backlight plate 23 and buzzer 24 serve to provide visual and sound effects. The processing unit 20 has an auto-close function, when the system is not operated for a predetermined time period, the processing unit 20 will close the power switch 25.

The power switch 25 serves to open or close the system.

The adjusting unit 26 serves to adjust the setting values.

The battery set 27 serves to provide power to the system.

The heating sensing unit 21 has a thermal resistor 211 and a resistor unit 212. The thermal resistor 211 is installed at a measuring end 11 at a front end of the thermometer body 10 for moving and closing to an object to be measured so as to be in a thermal balance state. When the thermal resistor 211 is in a thermal balance state with an object to be measured for a predetermined time period, the measurement is complete. The temperature variation of the thermal resistor 211 will change the resistance thereof. The variation will compare with the resistor unit 212 so as to get the temperature of the users. In the present invention, the thermal resistor 211 can be changed by other suitable thermal sensing element.

The display unit 22 may be a liquid crystal display for receiving electronic signals from the processing unit 20. The values of the temperatures are displayed digitally. The display unit 22 is installed at one side of the thermometer body 10 so that the user can view the value.

The backlight plate 23 is installed at a bottom of the display unit 22 and is controlled by the processing unit 20. When the measurement of the temperature is to be completed, the backlight plate 23 will emit light for informing the users. The backlight plate 23 can emit green light and red light. The ratio of green light and red light is adjusted based on the measured temperature. When the measured temperature is over the normal temperature range of the human body, the red light has a greater ratio. The more the ratio of red light, the greater the temperature over the human body.

The buzzer 24 is installed at one end of the thermometer body 10 and is controlled by the processing unit 20. When the temperature measuring is complete, the buzzer 24 will emit sound to alert the users. If the measured temperature is over the normal temperature range of human body, the sound from the buzzer 24 has higher frequency.

The power switch 25 can be pressed from an outer side of the thermometer body 10 for closing an opening the thermometer body 10.

The adjusting unit 26 has a plurality of buttons 261 for setting various values, for example the normal temperature of human body, or the time period of measuring time, or display unit, etc.

In use of the present invention, referring to FIGS. 3 to 7, the power switch 25 is pressed firstly for actuating the power switch 25. Then the measuring end of the thermometer body 10 is placed to be near the object to be measured so that the thermal resistor 211 of the heating sensing unit 21 is in thermal balance with the object.

Figure 5:
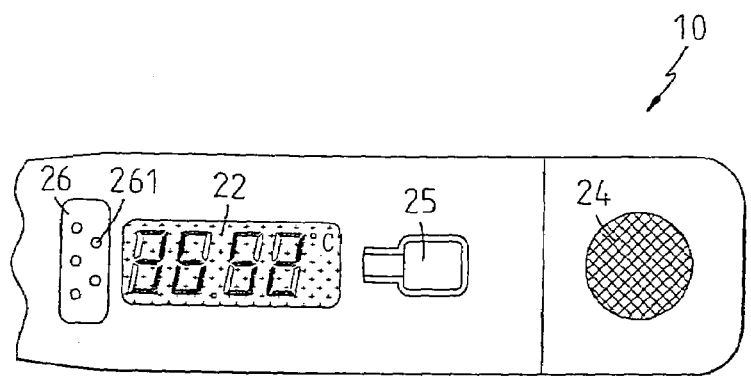
FIG. 5 shows the states of the display unit of the present invention, where the backlight plate emits light.
Figure 6:
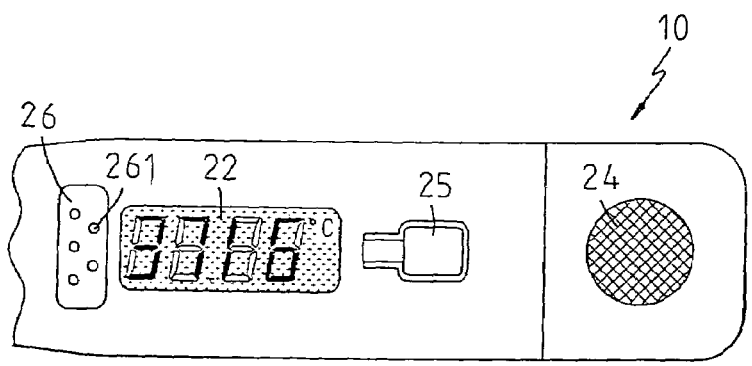
FIG. 6 shows the states of the display unit of the present invention, where the backlight plate emits light with less red light therein.
Figure 7:
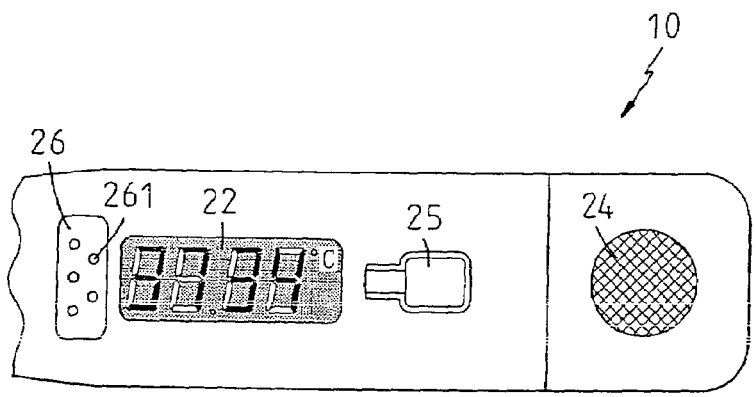
FIG. 7 shows the states of the display unit of the present invention, where the backlight plate emits light with more red light therein.

If the thermal resistor 211 is retained in a balance state, at a time of two second before the measuring time period, the backlight plate 23 will emit green light firstly to illuminate the display unit 22 to indicate that ht measurement of the temperature will be complete (referring to FIG. 5). The temperature measurement of the heating sensing unit 21 will be stopped by the processing unit 20 within a time period of one second. Then after one second from the measurement, the temperature is re-measured again. If the thermal resistor 211 of the heating sensing unit 21 has same heat balance state, when achieve the measuring time, the measurement is complete. Otherwise, the measurement is not complete.

After complete the measurement of temperature, the processing unit 20 determines whether the measurement temperature is within a normal value of human body, the buzzer 24 emits sound to alert the user and the backlight plate 23 emits green light. If after a time period is elapsed, no operation is performed, the processing unit 20 stops the thermometer body 10.

If the processing unit 20 determines that the measured body temperature is over a normal range, the buzzer 24 emits high frequency sound to alert the user. The backlight plate 23 emits red light and green light. The more the ratio of red light, the greater the temperature over the human body. For example, if the measured body temperature is between 37 to 37.2° C., then 80% green light with 20% red light is emitted to the display unit 22 (referring to FIG. 6). If the measured body temperature is between 37.2 to 37.4° C., then the 60% green light with 40% red light is emitted to the display unit 22 (referring to FIG. 7). If the thermometer body 10 is not been operated in a predetermined time period, the processing unit 20 will close the system.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A digital thermometer having a thermometer body comprising:

a processing unit serves to integrate the signals of the digital thermometer and set some operations; the processing unit calculating temperature from a heating sensing unit and then transferring temperature signals; before a predetermined measured time, if a thermal balance has been achieved, the processing unit will conduct a backlight plate to emit light so as to alert the user that the measurement will be completed, and the processing unit will stop the measurements within a predetermined time period and then temperature is re-measured, wherein said predetermined measured time is a predetermined temperature measuring time for said thermometer;

the heating sensing unit for sensing temperatures of an object to be measured; wherein the thermal balance is a thermal balance between the heating sensing unit of said thermometer and an object;

a display unit for receiving electronic signals from the heating sensing unit so as to display the measured temperature; and the backlight plate for receiving signals from the processing unit and emitting light to illuminate the display unit.

2. The digital thermometer as claimed in claim 1, wherein the temperature measurement of the heating sensing unit will be stopped by the processing unit within a time period of one second; then after one second from the measurement, the temperature is re-measured again; if the thermal resistor of the heating sensing unit has same heat balance state, when achieve the measuring time, the measurement is complete.

3. The digital thermometer as claimed in claim 1, wherein the thermometer body is installed with an adjusting unit for adjusting the measure time period.

4. The digital thermometer as claimed in claim 1, wherein the processing unit has a function of auto-closing the digital thermometer.

5. The digital thermometer as claimed in claim 1, wherein the backlight plate emits two kinds of lights and the ratio of the two kinds of lights are determined by the temperature measured.

6. The digital thermometer as claimed in claim 1, wherein the backlight plate emits green light and red light; the ratio of green light and red light is adjusted based on the measured temperature; when the measured temperature is over the normal temperature range of the human body, the red light has a greater ratio; the more the ratio of red light, the greater the temperature over the human body.

7. The digital thermometer as claimed in claim 1, wherein the thermometer body has a buzzer; the buzzer is controlled by the processing unit and the buzzer emits sound after complete the measurement.

8. The digital thermometer as claimed in claim 1, wherein when the measured temperature is over a normal temperature of human body, the buzzer will emit high frequency sound.

9. The digital thermometer as claimed in claim 6, wherein the thermometer body has an adjusting unit for setting a normal temperature value of human body.

10. The digital thermometer as claimed in claim 8, wherein the thermometer body has an adjusting unit for setting a normal temperature value of human body.

* * * * *